March 31, 1931.  O. W. YOUNG  1,798,512
WOOD SHAPING AND FINISHING MACHINE
Filed Aug. 8, 1930   2 Sheets-Sheet 2
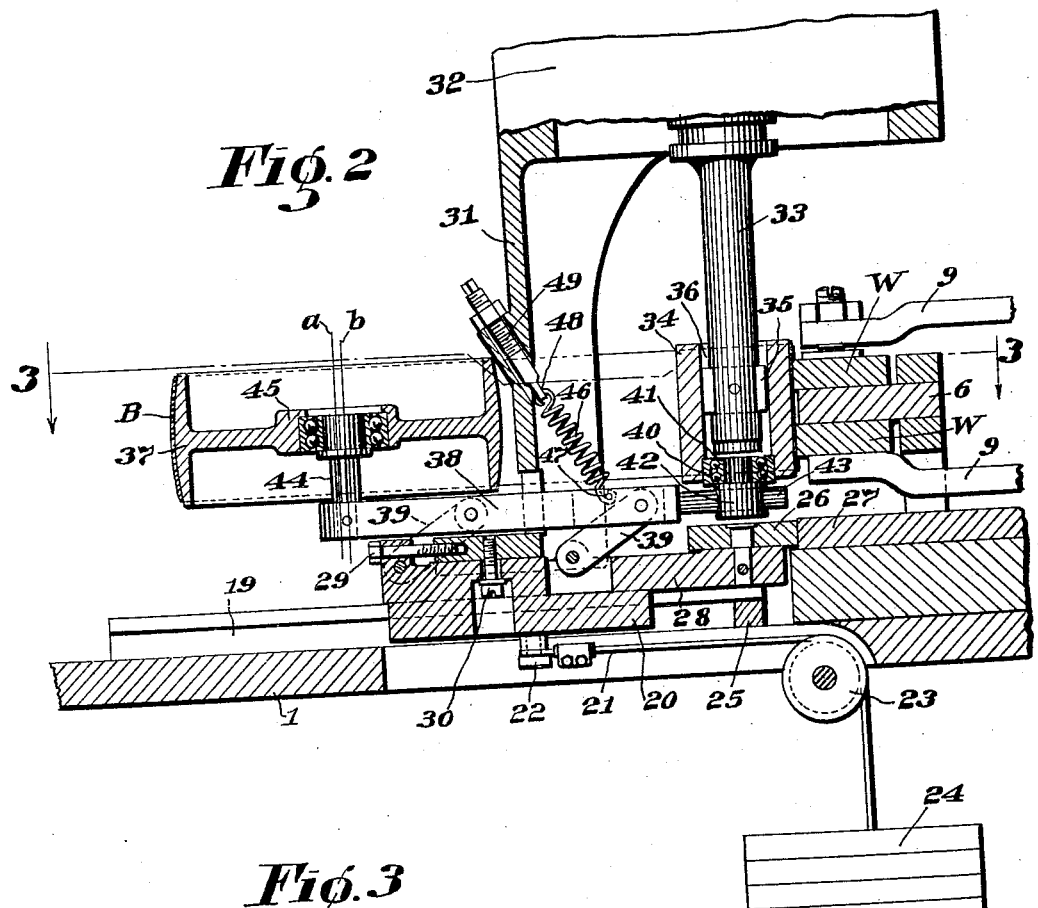
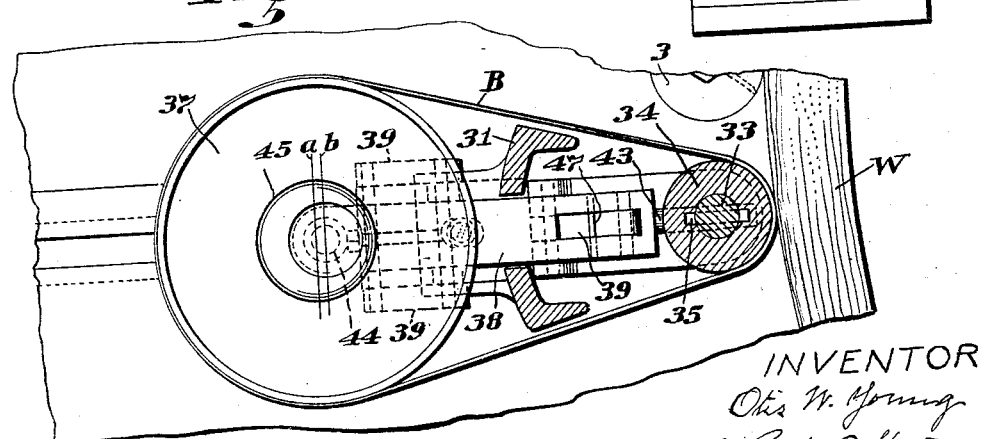

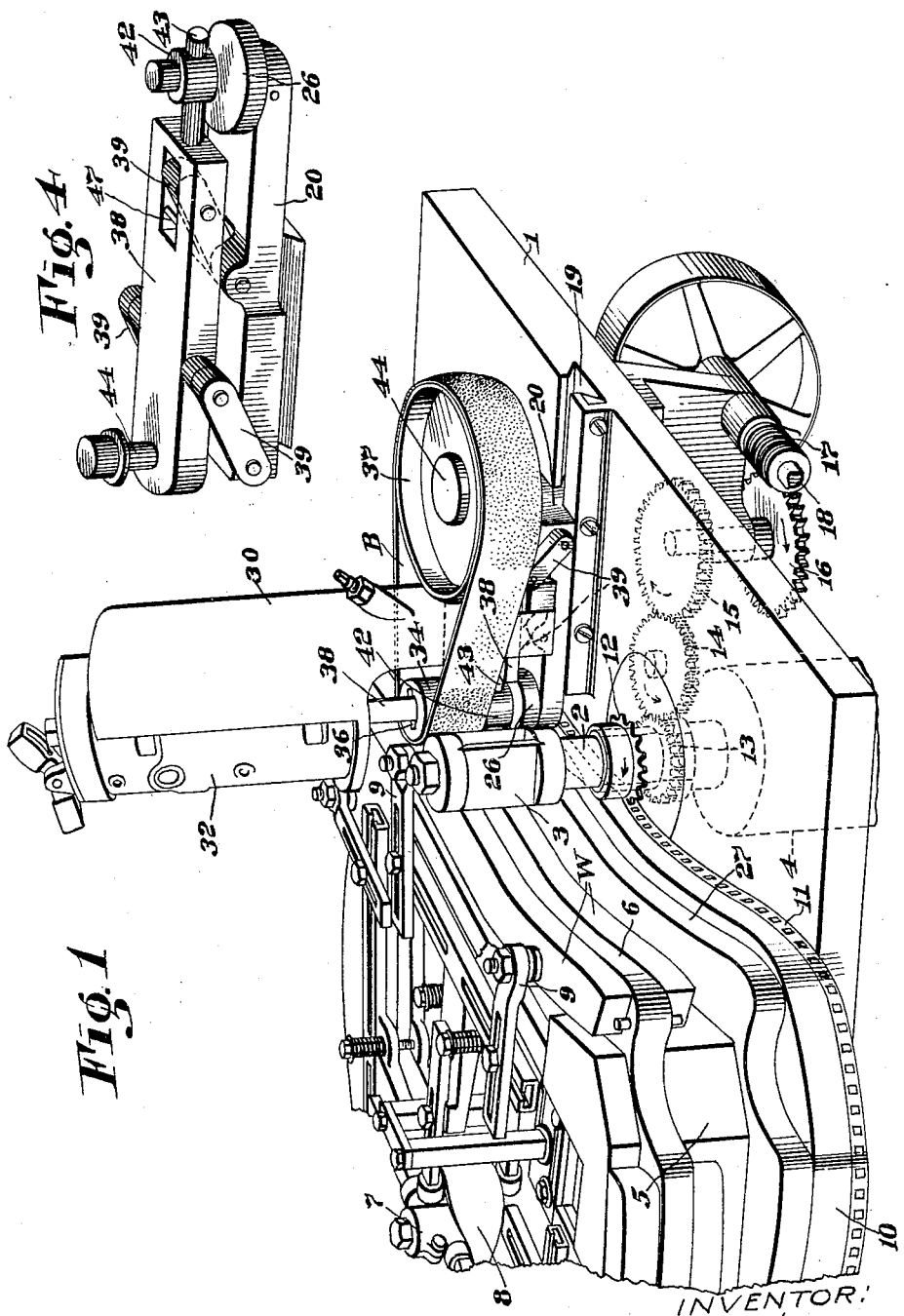

Patented Mar. 31, 1931

1,798,512

UNITED STATES PATENT OFFICE

OTIS W. YOUNG, OF WINCHENDON, MASSACHUSETTS, ASSIGNOR TO BAXTER D. WHITNEY & SON, INC., OF WINCHENDON, MASSACHUSETTS, A CORPORATION OF MASSACHUSETTS

WOOD SHAPING AND FINISHING MACHINE

Application filed August 8, 1930. Serial No. 473,829.

This invention relates to wood shaping and finishing machines wherein the work is given the desired shape and the shaped surface is finished to present the smooth character desired.

In wood shaping machines it is now the general practice to subject the work to the action of one or more wood shaping cutters rotated at high speed, which serve to impart the desired shape to the work, and where the grain of the wood changes it has been the custom to move the work from its operative relation with one cutter and present it to another cutter rotating in the opposite direction. In the patent granted to William M. Whitney, No. 1,597,748, dated August 31, 1926, there is shown and described a wood shaping machine for completing the shaping operation by two cutters rotating in opposite directions and by a single passage of the work through the machines, thereby greatly simplifying the former practice and increasing the output.

In the present invention, whether the shaped surface is formed by one or a plurality of cutters in accordance with the present practice, the work is subjected to a finishing operation after it has been shaped by the cutter or cutters, with the result that the shaped work is delivered from the machine with the shaped surface of the desired smooth and finished character.

It is an object of this invention to provide a machine of the type indicated with wood shaping means and a finishing member having an abradant surface, such, for instance, as sand paper, emery or the like, mounted adjacent the shaping means to act upon the work following the action of the shaping means to impart a finished character to the shaped surface as it is shaped and in one passage of the work through the machine.

The abradant finishing surface may be variously contrived and be so mounted and operated adjacent the shaping cutter as to act successive thereto, but should the abradant material be moved in a constant path of travel as it acts upon the work, the finished surface might be more or less channeled or scored thereby. It is, therefore, a purpose of the present invention to provide means for imparting to the abradant material a reciprocating movement crosswise of the work as it acts progressively upon the shaped surface.

Another feature of the invention consists of traveling the abradant surface at high speed by a driven pulley and to prevent mechanical difficulties by imparting the described reciprocating movement to the abradant material of less frequency than the rotating periods of the pulley.

The invention and novel features thereof will best be made clear from the following description and accompanying drawings of one practical embodiment thereof.

In the drawings:

Fig. 1 is a perspective view of sufficient portions of a wood shaping machine containing the present invention to make clear the relation and operation of the parts thereof;

Fig. 2 is a vertical section showing more particularly the finishing mechanism;

Fig. 3 is a section on the line 3—3, Fig. 2; and

Fig. 4 is a detached detail showing parts of the finishing mechanism and the mounting thereof.

In accordance with the present invention, the wood shaping means, such as rotary shaping cutters and work carrier, may be of any desired character, but in the form shown are substantially similar to like parts as disclosed in the patent to William M. Whitney, above mentioned, with which are combined the features constituting the finishing elements acting upon the work in proximity to the wood shaping means.

The machine frame, such as in the Whitney patent, supports a table 1 through which extends the cutter shaft 2 carrying the shaping cutter 3 driven by a motor 4 beneath the table, and mounted on the table 1 is the work carrier 5 having a work support or datum member 6 for holding the work W to be shaped and finished.

The work carrier 5 is mounted for rotative movement upon a fixed stud shaft 7 secured to which is the cam 8 for automatically operating the work clamps 9 for securing the work upon the carrier. The work carrier 5 is mounted for movement towards and from the work presenting position, but the details of such features as hereinbefore described are similar to the like features more fully shown and described in the Whitney patent and require no further amplification at this time.

The base portion 10 of the work carrier is provided with a rack 11 which is engaged by a rack gear 12 mounted concentric with the shaping cutter shaft, and the rack gear 12 is independently actuated by a train of mechanism, such for instance, as the gears 13, 14, 15 and 16 from a worm 17 on the belt driven shaft 18, with the result that when the work carrier is in work presenting position it will be progressively traveled to present successive portions of the work to the action of the wood shaping and finishing means, as will more fully appear.

In accordance with the present invention, the work finishing member is mounted adjacent the shaping cutter, so that as the wood is shaped it is presented progressively to the finishing member to finish and smooth the shaped surface. The finishing member as a whole is mounted for movement towards and from the work, and while the means for presenting the work finishing member to the work may be variously contrived or like that in the Whitney patent hereinbefore mentioned, in the present instance of the invention it is shown as movable towards and from the work in a straight path adjacent the shaping cutter.

The table 1 is provided with a guideway 19 preferably of dove-tail shape, in which may slide a pulley carrier 20 supporting and presenting the finishing member for action upon the work, and in order that the slide may be impelled towards the work it is actuated by a flexible connection 21 secured to the slide at 22 and passing over a guide pulley 23 below which are the adjustable weights 24 normally acting to move the finishing member slide towards the work, and to limit the movement of the slide under the impulse of the weights 24 a stop 25 is provided, as more clearly indicated in Fig. 2.

The slide 22 is provided with a work carrier engaging roller 26 which, when the slide is in position to present the finishing member to the work, rides along the lower portion 27 of the work carrier, and in order to provide for proper presentation of the finishing member to the work and insure proper action upon the work, the slide 20 is provided with an adjustable portion 28 on which preferably is mounted the roller 26. The adjustable member 28 may be secured to the slide 20 adjustably by any approved means, but, as shown, such adjusting means consists of the screw 29 threaded into the adjustable member 28 whereby the said member may be moved relatively to the slide and clamped in adjusted position by the clamping screw 30.

Rising from the adjustable member 28 is the motor frame 31 on which is mounted a motor 32 having a motor shaft 33 extending downwardly therefrom, and connected to the motor shaft 33 at its lower portion for rotation therewith and sliding movement longitudinally thereon is a pulley 34. As shown, the pulley 34 is connected to the motor shaft 33 by a spline or key 35 received in appropriate grooves 36 formed in the interior of the pulley 34, the construction being such that while the pulley 34 will rotate with the motor shaft, it is yet capable of sliding movement longitudinally thereof.

In accordance with the present invention, the pulley 34 supports an abradant surface which constitutes the finishing member for the work, and while such abradant surface may be variously contrived and supported by the pulley 34 it is shown in the present instance of the invention as a belt B the exterior surface of which is supplied with an abradant, such, for instance, as sand paper, emery, or the like, and such belt likewise passes about an idler pulley 37, the construction being such as thus far described that the abradant material supported by the pulley 34 will act upon the shaped surface immediately after it has been shaped by the shaping cutter, to thereby finish and smooth such surface.

Mounted upon the adjustable member 28 of the slide for movement longitudinally and vertically with reference thereto is the pulley supporting member 38 which as shown in the present instance of the invention is connected to the adjustable member 28 of the slide by the parallel links 39, the result being that should the pulley supporting member be moved longitudinally it will also partake of the movement transversely of its length which is imparted thereto by the parallel links.

Secured to the pulley 34 for rotative movement therewith is a collar 40 and inward of the collar 40 is the relatively loose collar 41 and between the two are interposed antifriction rollers. The loose collar 41 has secured thereto a stud 42 having an opening therethrough to receive the end portion 43 of the pulley supporting member 38, the construction being such that the end portion 43 of the pulley supporting member may move longitudinally through the opening of the stud 42 and by its movement transversely of its length through the action of the links 39 may cause the pulley 34 to be moved upwardly and downwardly, thereby traversing the abradant surface transversely to its normal movement.

The pulley supporting member 38 has rising from its outer end a stud or pin 44, the upper end portion of which supports the idler pulley 37 about which the abradant belt passes.

The idler pulley 37 has its hub portion 45 eccentric to the central axis of the stud or pin 44, and between the hub portion 45 of the idler pulley and the stud or pin 44 there are shown antifriction rollers.

In accordance with the present invention, the abradant belt is to be held taut and under tension and in the present instance of the invention, this is done by means of a spring 46 connected at one end 47 to the pulley supporting member 38 and at its other end 48 to an adjusting screw 49, the result being that the pulley supporting member will be under the normal tension of the spring 46 to maintain the abradant belt under tension and yet permit longitudinal movement of the pulley supporting member 38 under the action of the eccentric portion of the idler pulley 37, the consequence being that as the pulley 34 is rotated at high speed, the pulley 37 will be rotated at somewhat less speed and impart to the pulley supporting member 38 a reciprocating movement of an amplitude indicated by the lines $a$ and $b$, Fig. 2.

As hereinbefore indicated, it is desirable that the pulley 34 which supports the abradant material shall be rotated at high speed from the motor shaft, but if the reciprocating impulses transmitted from the idler pulley 37 through the pulley supporting member 38 are as frequent as the revolving periods of the pulley 34, mechanical difficulties will be developed and interfere with the proper action of the machine. The idler pulley 37, therefore, is made larger than the pulley 34 which holds the abradant material to its work.

In operation the motor shaft 33 will be rotated at high speed, as will also the pulley 34, and the idler pulley 37 will be rotated at a speed less than the pulley 34, with the result that during the rotation of the pulley 34 the idler pulley will transmit thereto through the means described, a vertical reciprocating movement of less frequency than the rotative periods of the pulley 34, with the effect that the path of travel of the abradant material will be changed, to thereby prevent channeling or scoring the shaped surface of the work.

What is claimed is:

1. In a wood shaping machine, the combination of a wood shaping cutter, a belt having an abradant surface, an active pulley mounted adjacent the cutter and about which the abradant surfaced belt passes to act upon the work immediately after it has been shaped by the cutter, an idler pulley about which the belt passes, operating means for the pulleys and belt, and means actuated by rotation of the idler pulley for reciprocating the belt transversely of its length of less frequency than the rotating periods of the active pulley as the belt acts upon the work to prevent scoring the finished surface of the work.

2. In a wood shaping machine, the combination of a work carrier, a wood shaping cutter to act upon and shape the work, a finishing belt having an abradant surface, a belt presenting pulley mounted adjacent the shaping cutter for presenting the abradant surface to the work immediately after it has been shaped by the cutter driving means for the work carrier to travel the work successively past the cutter and abradant surface, means for rotating the pulley about its axis to travel the belt past the work, and means for imparting reciprocating motion to the pulley of less frequency than its rotating periods to travel the abradant surfaced belt longitudinally of the pulley axis.

3. In a wood shaping machine, the combination of a wood shaping cutter to act upon and shape the work, a belt having an abradant surface, a belt presenting pulley adjacent the cutter to present the abradant surface of the belt for action upon the work after it has been shaped by the cutter, and an idler pulley about both of which pulleys the belt passes, means for rotating the presenting pulley at high speed, and means controlled from the idler pulley for imparting reciprocating movements to the presenting pulley of less frequency than its rotating periods.

4. In a wood shaping machine, the combination of a wood shaping cutter for acting upon and shaping the work, a belt having an abradant surface, a belt presenting pulley mounted adjacent the cutter to present the abradant surface of the belt for action upon the work after it has been shaped by the cutter, a motor for rotating the presenting pulley at high speed, an idler pulley of larger size than the presenting pulley, and means actuated from the idler pulley for imparting reciprocating movements to the presenting pulley of less frequency than its rotating periods.

5. In a wood shaping machine, the combination of a wood shaping cutter for acting upon and shaping the work, a belt having an abradant surface, a belt presenting pulley mounted adjacent the cutter to present the abradant surface of the belt for action upon the work after it has been shaped by the cutter, a motor for rotating the presenting pulley at high speed, an idler pulley of larger size than the presenting pulley, a supporting member for supporting both of said pulleys and mounted for longitudinal movements, means for causing the supporting member to move transversely of its length as it is moved longitudinally, and means actuated by the idler pulley to impart longitudinal movements to the supporting member of less frequency than the rotating periods of the presenting pulley.

6. In a wood shaping machine, the combination of a wood shaping cutter to act upon and shape the work, a presenting pulley and an idler pulley, a belt having an abradant surface passing about each of the pulleys, a motor for rotating the presenting pulley at high speed, a supporting member for supporting both of the pulleys and mounted for longitudinal movement, means for causing the supporting member to rise and fall as it is moved longitudinally, a spring normally acting to maintain the belt under tension, and means actuated from the idler pulley to move the supporting member longitudinally with less frequency than the rotating periods of the presenting pulley.

7. In a wood shaping machine, the combination of a wood shaping cutter to act upon and shape the work, a presenting pulley and an idler pulley, a belt having an abradant surface passing about each of the pulleys, a motor for rotating the presenting pulley at high speed, a connection between the presenting pulley and motor permitting reciprocating movements of the presenting pulley in the direction of its axis, a supporting member for supporting both of the pulleys and mounted for longitudinal movement, means for causing the supporting member to rise and fall as it is moved longitudinally, a spring normally acting to maintain the belt under tension, and means actuated from the idler pulley to move the supporting member longitudinally with less frequency than the rotating periods of the presenting pulley.

8. In a wood shaping and finishing machine, the combination of a work carrier, a wood shaping cutter to act upon and shape the work, a presenting and an idler pulley, a support for said pulleys, means normally acting to move the support and pulleys towards the work carrier, a belt passing about both of said pulleys and having an abradant surface, means for moving the work carrier past the shaping cutter and presenting pulley to cause the work to be shaped and finished, and means actuated from the idler pulley for imparting to the presenting pulley reciprocating movements of less frequency than the rotating periods of the presenting pulley.

9. In a wood shaping and finishing machine, the combination of a work carrier, a shaping cutter mounted at one side of the work carrier, a presenting pulley and an idler pulley at one side of the work carrier, an abradant surfaced belt passing about both of said pulleys, means normally acting to move the pulleys and belt toward the work carrier that the work may be shaped and finished as the work carrier moves the work past the cutter and belt, and means for reciprocating the presenting pulley as it is rotated.

10. In a wood shaping and finishing machine, the combination of a work carrier, a shaping cutter mounted at one side of the work carrier, a presenting pulley and an idler pulley at one side of the work carrier, an abradant surfaced belt passing about both of said pulleys, means normally acting to move the pulleys and belt toward the work carrier that the work may be shaped and finished as the work carrier moves the work past the cutter and belt, and an eccentric actuated from the idler pulley for reciprocating the presenting pulley as it is rotated.

11. In a wood shaping and finishing machine, the combination of a work carrier, a shaping cutter, a presenting pulley and an idler pulley mounted adjacent the shaping cutter, an abradant belt passing about said pulley, a support for said pulley, means normally acting to move the said support towards the work carrier, a roller mounted on the support to engage the work carrier and position the abradant belt for treatment of the work after it has been shaped by the shaping cutter, and means actuated by rotation of the idler pulley for reciprocating the belt in the direction of its width as it travels along the work.

12. In a wood shaping and finishing machine, the combination of a work carrier, a shaping cutter, a presenting pulley and an idler pulley, an abradant belt passing about both pulleys, a pulley carrier for said pulleys, means normally urging the pulley carrier towards the work carrier, a pulley supporting member, means actuated by the idler pulley for moving the pulley supporting member lengthwise, and connections between the pulley supporting member and the pulley carrier for causing lengthwise movement of the pulley supporting member to reciprocate the abradant belt widthwise.

In testimony whereof, I have signed my name to this specification.

OTIS W. YOUNG.